(12) United States Patent
Hara (10) Patent No.: US 7,053,633 B2
(45) Date of Patent: May 30, 2006

(54) CAPACITANCE DETECTION DEVICE AND DRIVE METHOD THEREOF, FINGERPRINT SENSOR, AND BIOMETRICS AUTHENTICATION DEVICE

(75) Inventor: Hiroyuki Hara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/808,523

(22) Filed: Mar. 25, 2004

(65) Prior Publication Data

US 2004/0247163 A1 Dec. 9, 2004

(30) Foreign Application Priority Data

Apr. 17, 2003 (JP) ............... 2003-112842

(51) Int. Cl.
*G01R 27/26* (2006.01)
*G06K 9/00* (2006.01)

(52) U.S. Cl. ...................... 324/686; 382/124
(58) Field of Classification Search ............... 382/124, 382/115–116, 108; 324/686–690, 658–663, 324/76.66
See application file for complete search history.

(56) References Cited

U.S. PATENT DOCUMENTS

| | | | |
|---|---|---|---|
| 4,429,413 A | | 1/1984 | Edwards |
| 6,049,620 A | | 4/2000 | Dickinson |
| 6,320,394 B1 | * | 11/2001 | Tartagni ............... 324/671 |
| 6,438,257 B1 | * | 8/2002 | Morimura et al. ......... 382/124 |
| 6,448,790 B1 | * | 9/2002 | Imai ................ 324/661 |
| 6,512,381 B1 | * | 1/2003 | Kramer ............. 324/658 |
| 6,681,033 B1 | * | 1/2004 | Yano et al. ............ 382/124 |
| 2003/0222659 A1 | * | 12/2003 | Miyasaka ........... 324/661 |

FOREIGN PATENT DOCUMENTS

| | | |
|---|---|---|
| EP | 0 969 477 A1 | 1/2000 |
| EP | 1 041 356 A1 | 10/2000 |
| JP | A 58-27277 | 2/1983 |
| JP | A 11-118415 | 4/1999 |
| JP | 11-312811 | 11/1999 |
| JP | A 2000-028311 | 1/2000 |
| JP | A 2000-346608 | 12/2000 |
| JP | A 2000-346610 | 12/2000 |

(Continued)

OTHER PUBLICATIONS

Hiroyuki Hara et al., "Low Temperature Polycrystalline Silicon TFT Fingerprint Sensor with Integrated Comparator Circuit", IEEE, Sep. 21-23, 2004, pp. 403-406.

(Continued)

*Primary Examiner*—Diane I. Lee
*Assistant Examiner*—Marina Kramskaya
(74) *Attorney, Agent, or Firm*—Oliff & Berridge, PLC (57) ABSTRACT

The object of the present invention is to provide a high-precision fingerprint sensor. In order to achieve this object, the fingerprint sensor of the present invention comprises a matrix portion in which capacitance detection circuits, which each output a detection signal corresponding to the capacitance formed between the capacitance detection circuit and a fingerprint, are arranged in the form of a matrix; and an amplification circuit for amplifying this detection signal. The amplification circuit functions as a signal source for outputting a detection signal to the capacitance detection circuit and is constituted such that the detection signal is transmitted from the amplification circuit to the low potential source line via the capacitance detection circuit.

12 Claims, 6 Drawing Sheets

| | FOREIGN PATENT DOCUMENTS | |
|---|---|---|
| JP | A 2001-56204 | 2/2001 |
| JP | A 2001-133213 | 5/2001 |
| JP | A 2002-340517 | 11/2002 |
| JP | A 2003-004697 | 1/2003 |
| JP | A 2003-090703 | 3/2003 |
| JP | A 2003-254706 | 9/2003 |
| JP | 2005241892 A * | 9/2005 |

OTHER PUBLICATIONS

Ryuichi Hashido et al., "A Capacitive Fingerprint Sensor Chip Using Low-Temperature Poly-Si TFTs on a Glass Substrate and a Novel and Unique Sensing Method", IEEE Journal of Solid-State Circuits, Feb. 2003, vol. 38, No. 2, pp. 274-280.

* cited by examiner

CAPACITANCE DETECTION DEVICE AND DRIVE METHOD THEREOF, FINGERPRINT SENSOR, AND BIOMETRICS AUTHENTICATION DEVICE

BACKGROUND

1. Field of the Invention

The present invention relates to a capacitance detection technology for reading the shape of a subject surface with minute asperity such as a fingerprint as a capacitance variation.

2. Description of the Related Art

Japanese Patent Application Laid-Open Nos. H11-118415, 2000-346608, 2001-56204, and 2001-133213 disclose a technology that covers the surface of a sensor electrode, which is formed on a single-crystal silicon substrate, with a dielectric film, and, with a fingerprint potential serving as the reference potential, identifies a fingertip by utilizing the change in the capacitance formed between the fingertip and sensor electrode in accordance with the asperity of the fingerprint.

However, a conventional capacitance-type fingerprint sensor is formed on a single-crystal silicon substrate. Hence, there has been the problem that the fingerprint sensor splits when pressed strongly by a fingertip. In addition, the fingerprint sensor must be formed with a size that is about the size of the area of a fingertip (approximately 20 mm×20 mm), and therefore, the formation of the fingerprint sensor on a single-crystal silicon substrate generates problems such as high costs. In addition, in the case of a conventional constitution, in which capacitance detection circuits, in which a sensor electrode and transistor are combined, are arranged in the form of a matrix, and the variation in the capacitance formed between the sensor electrode and fingertip is utilized to drive the transistor such that a current flows out to an external circuit, there are restrictions on the size of the transistor disposed in the fingerprint detection unit. Therefore, sufficient current drive performance cannot be obtained and there is the problem that high-precision sensing is not feasible, and so forth.

SUMMARY

The present invention accordingly solves the above problems, an object thereof being to propose a capacitance detection device that is capable of highly accurate and stable sensing, a fingerprint sensor, and a biometrics authentication device.

It is a further object of the present invention to provide a capacitance detection device that is strong enough to tolerate practical application, a fingerprint sensor, and a biometrics authentication device at low cost.

It is another object of the present invention to propose a method that permits high-precision sensing of capacitance.

In order to achieve the above objects, the capacitance detection device of the present invention is a capacitance detection device that reads asperity information for a subject surface by outputting a detection signal corresponding to the capacitance formed between the subject surface and the capacitance detection device, comprising: a detection unit in which is arranged a plurality of capacitance detection circuits that output the detection signal; and an amplification circuit that amplifies the detection signal. The capacitance detection circuit comprises a sensor electrode for forming a capacitance between the subject surface and the sensor electrode, a signal output element that outputs a detection signal corresponding to the capacitance, and a low potential source line that connects to the signal transmission path of the detection signal. The amplification circuit functions as a signal source for outputting the detection signal to the capacitance detection circuit and is constituted such that the detection signal is transmitted from the amplification circuit to the low potential source line via the signal output element. As a result of this constitution, because the amplification circuit for amplifying the detection signal can be constituted as a separate body from the capacitance detection circuit, the size of the transistor constituting the amplification circuit can be designed to be relatively large, whereby the detection accuracy can be raised.

As a preferred embodiment of the present invention, the detection signal is desirably a current signal, and the amplification circuit desirably functions as a current source that supplies the current signal to the capacitance detection circuit. By using a current signal as the detection signal, it is possible to detect the capacitance formed between the capacitance detection device and subject surface without the decay caused by an external load.

As a preferred embodiment of the present invention, the amplification circuit is desirably formed outside the formation region of the detection unit. Because a plurality of capacitance detection circuits are arranged highly densely in the detection unit, there are restrictions on the transistor size, which causes difficulties in raising the current drive performance. However, by forming the amplification circuit outside the detection-unit formation region, it is possible to achieve a design that is not subject to restrictions on transistor size, whereby the current drive performance of the amplification circuit can be raised. High-precision sensing is therefore possible.

As a preferred embodiment of the present invention, the capacitance detection device desirably further comprises a plurality of select lines for selecting the capacitance detection circuit, and a plurality of data lines for outputting the detection signal from the amplification circuit to the capacitance detection circuit, wherein the capacitance detection circuit desirably further comprises a select transistor that connects to the respective select line and is desirably constituted such that the passage and shutoff of electricity between the respective data line and signal output element is controlled by means of open/close control of the select transistor. As a result of this constitution, a multiplicity of capacitance detection circuits arranged in the detection unit can be actively driven and hence high-resolution sensing is possible.

As a preferred embodiment of the present invention, the capacitance detection device desirably further comprises pre-charging means that pre-charge the data line as a stage prior to outputting the detection signal on the data line. By pre-charging the data lines at a stage prior to sensing, the potential of the data lines can be stabilized and hence the speed of sensing can be raised.

As a preferred embodiment of the present invention, the capacitance detection device further comprises pre-charge period setting means for setting the ratio between the pre-charge period, in which the pre-charging means execute data-line pre-charging, and the sensing period, in which the signal output element outputs the detection signal. By shortening the pre-charge period, an adequate sensing period can be secured, and hence high-precision sensing can be performed.

As a preferred embodiment of the present invention, the signal output element is constituted as a three-terminal transistor having a current control terminal, a current input terminal, and a current output terminal, and further comprises potential control means for controlling the potential of the current control terminal to a predetermined potential as a stage prior to outputting the detection signal corresponding to the capacitance. As a result of this constitution, it is possible to stabilize the potential of the current control terminal by extracting the electric charge injected into the current control terminal of the three-terminal transistor, whereby the sensing accuracy can be raised.

As a preferred embodiment of the present invention, the capacitance detection circuit further comprises a reference capacitance of a fixed capacitance value; and the signal output element outputs a detection signal that corresponds to the capacitance ratio between the capacitance and reference capacitance. By providing a reference capacitance of a fixed capacitance value, the sensing accuracy can be raised.

As a preferred embodiment of the present invention, the capacitance detection circuit is formed on an insulating substrate. By forming the capacitance detection circuit on an insulating substrate, the mechanical strength of the sensor can be increased. Further, it is also possible to lower the production costs by adopting a glass substrate or plastic substrate, or the like, as the insulating substrate.

The fingerprint sensor of the present invention comprises the capacitance detection device of the present invention and is constituted to read fingerprint asperity information. As a result of this constitution, high-precision sensing of fingerprint information is possible.

The biometrics authentication device of the present invention comprises the fingerprint sensor of the present invention. Here, 'biometrics authentication device' refers to a device that implements a function to perform personal authentication by using the fingerprint information as biometrics information, and, in addition to a variety of card media that includes IC cards, cash cards, credit cards, and personal identification documents, includes every kind of security system such as electronic-commerce personal authentication devices, room entry/departure management devices, and computer-terminal authentication devices.

The drive method for the capacitance detection device of the present invention is a drive method for a capacitance detection device that comprises a current amplification element that increases or reduces the gain of a current signal in response to the capacitance formed between the capacitance detection device and a subject surface; a data line for supplying the current signal to the current amplification element; an amplification circuit that amplifies the current signal flowing through the data line; a select transistor that controls the passage and shutoff of electricity between the data line and current amplification element; and a low potential source line that connects to the output path of the current signal, the drive method comprising the steps of: electrically shutting off the data line and the current amplification element from each other by closing the select transistor; pre-charging the data line to a predetermined potential; allowing electrical conduction between the data line and current amplification element by opening the select transistor after the data-line pre-charging is complete; and performing sensing by supplying a current signal from the amplification circuit to the current amplification element via the data line and amplifying the current signal by means of current gain that corresponds to the capacitance. Therefore, by pre-charging the data line to a predetermined potential as a stage prior to amplifying the current signal by means of the current amplification element, a drop in sensing accuracy caused by a variation in the potential of the data line before sensing can be avoided and hence high-precision sensing is possible.

The ratio (the duty ratio) between the period for executing the pre-charging step (the pre-charging period) and the period for executing the sensing step (the sensing period) is desirably variable. Stabilizing the potential of the data lines to a predetermined potential for a short time by shortening the pre-charge period makes it possible to secure an adequate sensing period, whereby high-precision sensing is made possible.

DETAILED DESCRIPTION

FIRST EMBODIMENT OF THE INVENTION

A preferred first embodiment of the present invention will be described below with reference to the drawings.

Figure 2:
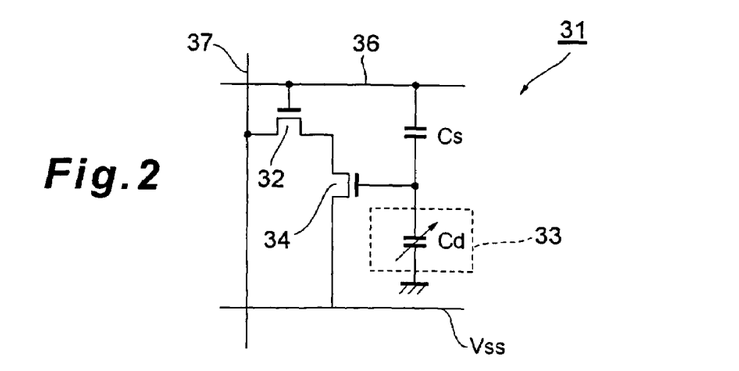
FIG. 2 shows the circuit constitution of the capacitance detection circuit of the first embodiment.

FIG. 2 shows the circuit constitution of a capacitance detection circuit 31 that converts asperity information for the fingerprint of a subject into an electrical signal. This detection circuit 31 is constituted comprising a select transistor 32 for selecting the detection circuit 31; a capacitance 33 formed between the test-subject's fingerprint and the sensor electrode; a signal output element 34 for outputting a detection signal that carries fingerprint asperity information based on a minute capacitance variation in the capacitance 33; a scan line 36 that transmits a signal that performs control to open and close the select transistor 32; a data line 37 for transmitting a detection signal; a low potential source line $V_{SS}$ that constitutes the output path of the detection signal; and a reference capacitance Cs of a fixed capacitance value. Supposing that the capacitance value of the capacitance 33 is Cd, the detected capacitance Cd is established in accordance with the distance between the asperity of the test-subject's fingerprint and the sensor electrode (see FIG. 4). There are no particular restrictions on the signal output element 34 as long as same is an element that outputs a detection signal that corresponds with the detected capacitance Cd. However, a signal amplification element (current amplification element), which performs a current amplification operation in accordance with the size of the detected capacitance Cd, is preferred. In this embodiment, a three-terminal transistor consisting of a gate terminal (current control terminal), source terminal (current output terminal), and drain terminal (current input terminal) serves as an example of this signal amplification element, but the signal amplification element is not limited to or by this three-terminal transistor.

In the above constitution, when a logical level H signal is output on the scan line 36 and the select transistor 32 enters an open state, a detection current, which is established at the gate potential of the signal output element 34 then flows to the data line 37. This detection current is processed as a detection signal that corresponds to the detected capacitance Cd. Fingerprint asperity information is contained in the detection signal. The gate potential of the signal output element 34 is established in accordance with the respective capacitance ratios of the capacitance of the parasitic capacitance Ct (not shown) of the signal output element 34 itself, the reference capacitance Cs, and the detected capacitance Cd.

For example, when the test-subject's fingerprint approaches the sensor electrode, when a protrusion in the fingerprint is close to the sensor electrode, the detected capacitance Cd grows sufficiently large relative to the parasitic capacitance Ct and reference capacitance Cs and hence the gate potential of the signal output element 34 approaches ground potential. As a result, the signal output element 34 enters a substantially OFF state and an extremely weak current flows between the source and drain of the signal output element 34. On the other hand, when an indentation in the fingerprint is close to the sensor electrode, the detected capacitance Cd grows sufficiently small relative to the parasitic capacitance Ct and reference capacitance Cs and hence the gate potential of the signal output element 34 approaches the potential of the scan line 36. When the scan line 36 is active, the potential of the scan line 36 is a high potential $V_{dd}$. As a result, the signal output element 34 enters a substantially ON state and a current larger than the above-mentioned weak current then flows between the source and drain of the signal output element 34. Here, the source terminal of the signal output element 34 is connected to the low potential source line $V_{SS}$. Hence, the orientation of the detection current flowing through the signal output element 34 is from the data line 37 to the low potential source line $V_{SS}$. That is, the detection signal carrying the asperity information for the test-subject's fingerprint is output so as to flow from an external circuit to the capacitance detection circuit 31.

Figure 4:
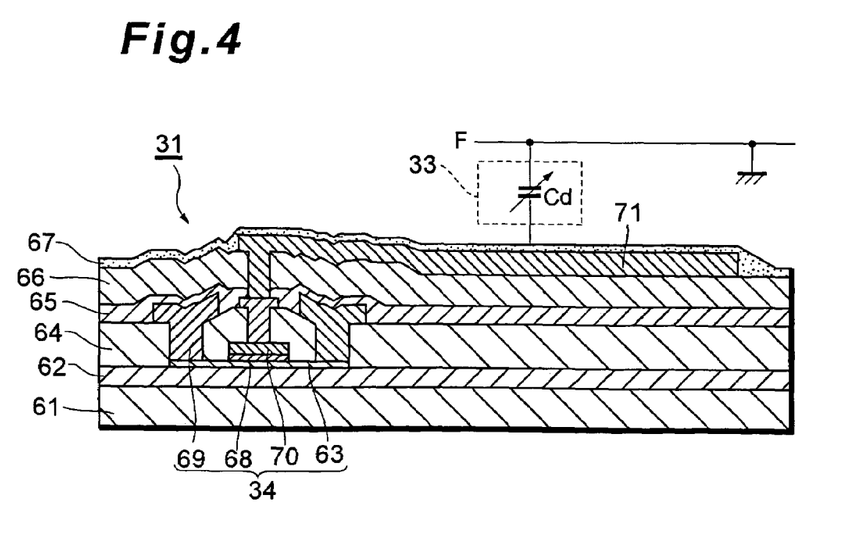
FIG. 4 is a cross-sectional view of the capacitance detection circuit of the first embodiment.

FIG. 4 is a cross-sectional view of the capacitance detection circuit 31 at whose center lies the sensor electrode. As this figure shows, the signal output element 34, which outputs a detection signal that carries fingerprint asperity information, and a sensor electrode (detection electrode) 71 for forming the capacitance 33 between the sensor electrode 71 and test-subject's fingerprint F are formed in the capacitance detection circuit 31. The signal output element 34 is a MOS transistor constituted comprising a gate electrode 70, a gate insulation film 68, a polycrystalline silicon layer 63, and a source/drain electrode 69. The capacitance 33 is a variable capacitance whose capacitance value varies in accordance with the asperity pattern of a fingerprint. The potential of the fingerprint F is set as the reference potential. The sensor electrode 71 is connected to the gate electrode 70 and is constituted to be able to transmit the variation in the detected capacitance Cd caused by fingerprint asperity to the signal output element 34 and sense the capacitance variation by means of an operation to amplify the drain current flowing through the channel.

In order to fabricate the capacitance detection circuit 31 shown in this figure, an underlying insulation film 62 of silicon oxide or the like is laminated on an insulating substrate 61, an amorphous silicon is deposited on the underlying insulation film 62 and crystallized to form the polycrystalline silicon layer 63. Next, the gate insulation film 68 and gate electrode 70 are formed on the polycrystalline silicon layer 63, an impurity is injected into and diffused within the polycrystalline silicon layer 63 in self-aligning fashion to form a source/drain region. Then, after forming a first interlayer insulation film 64, the source/drain region 69 is formed by making a contact hole. In addition, second interlayer insulation films 65 and 66 are laminated, a contact hole is made, and the sensor electrode 71 is formed. Finally, the whole of the surface is covered by a passivation film 67. Here, the second interlayer insulation films 65 and 66 form a dual-layer structure in which flatness is secured by the lower second interlayer insulation film 65 and the desired film thickness is obtained by the upper second interlayer insulation film 66. However, a single-layer structure may also be adopted.

Further, the formation of a semiconductor element such as a transistor on the insulating substrate 61 is not limited to the fabrication method above. A semiconductor element such as a transistor may be formed on the insulating substrate 61 by applying the separation transfer technologies disclosed in Japanese Patent Application Laid Open No. H11-312811 and 'S. Utsunomiya et. al. Society for Information Display p. 916 (2000)', for example. If a separation transfer technology is applied, a moderately strong low-cost substrate such as a plastic substrate or glass substrate can be adopted as the insulating substrate 61, and hence the mechanical strength of the capacitance-type fingerprint sensor 1 can be improved.

Figure 1:
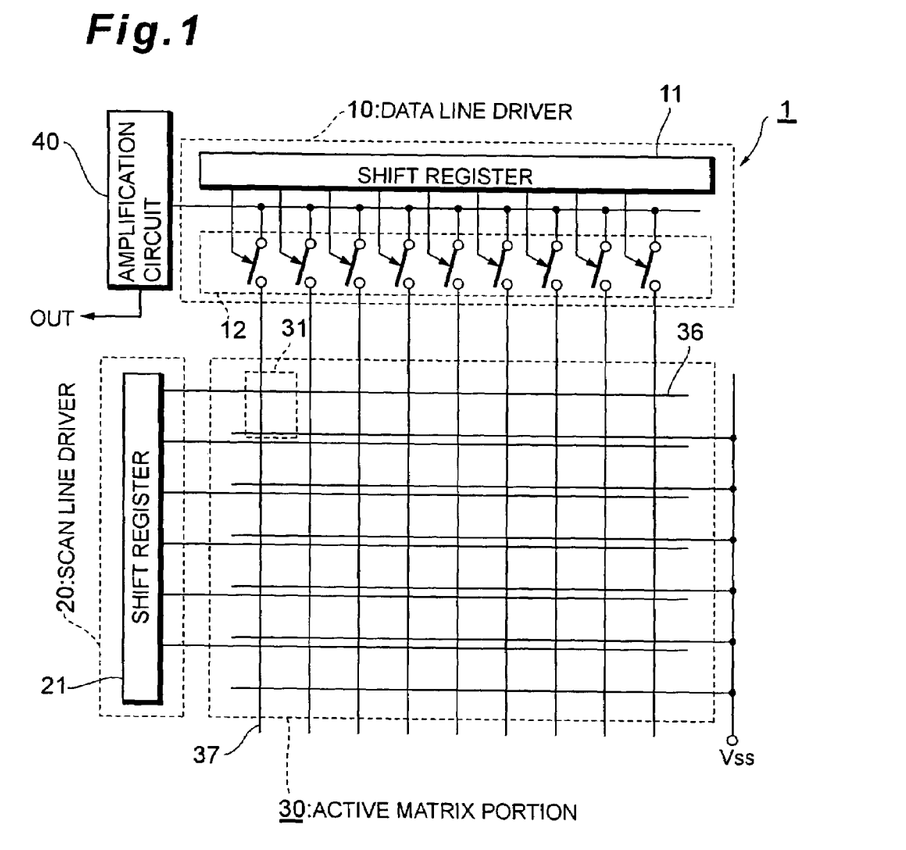
FIG. 1 is a block diagram of the capacitance-type fingerprint sensor of a first embodiment.

FIG. 1 is a block diagram of the capacitance-type fingerprint sensor 1 in which the capacitance detection circuits 31 above are arranged in the form of an active matrix. As this figure shows, the fingerprint sensor 1 is constituted comprising a data line driver 10 for selecting the data lines 37, a scan line driver 20 for selecting the scan lines 36, an active matrix portion 30 that functions as a fingerprint detection unit, and an amplification circuit 40 for amplifying the detection signal. The data line driver 10 is constituted comprising a shift register 11, which determines the timing for sequentially selecting the data lines 37, and an analog switch 12. The scan line driver 20 is constituted comprising a shift register 21, which determines the timing for sequentially selecting the scan lines 36. The capacitance detection circuits 31 are arranged in the form of a matrix (M rows×N columns) in the active matrix portion 30, in which M scan lines 36 and M low potential source lines $V_{SS}$ are wired in the row direction and N data lines 37 are wired in the column direction. In the above constitution, when the M scan lines 36 become active one line at a time, N data lines 37 that stand in a line on the scan line 36 that is active at a given point are sequentially selected by the analog switch 12 and thus sequentially driven to connect to the amplification circuit 40.

Figure 3:
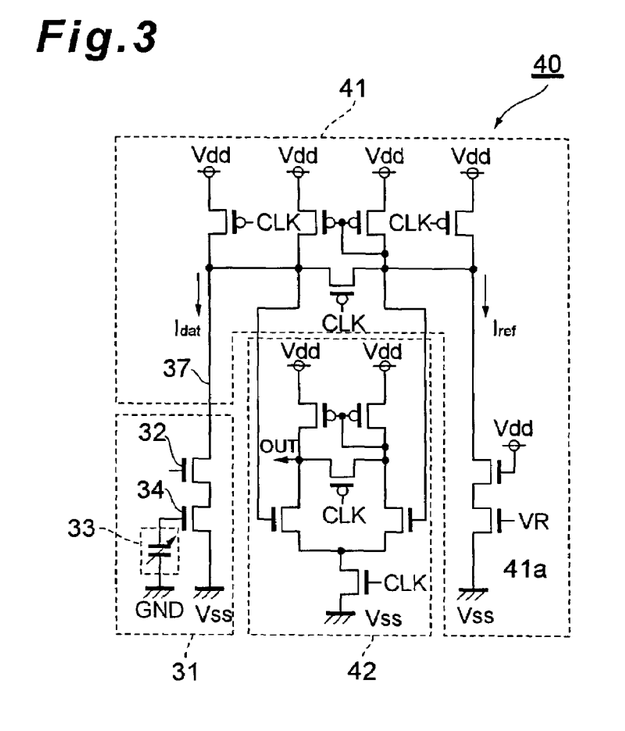
FIG. 3 shows the circuit constitution of the amplification circuit of the first embodiment.

FIG. 3 shows the circuit constitution of the amplification circuit 40, which amplifies the detection signal of the capacitance detection circuit 31. The amplification circuit 40 is constituted comprising a preliminary-stage current mirror circuit 41, and a subsequent-stage current mirror circuit 42. The preliminary-stage current mirror circuit 41 compares a fixed reference current $I_{ref}$ which is output by a MOS transistor 41a whose gate potential is held at the reference voltage VR, and a detection current $I_{dat}$, which is output by the signal output element 34, and the subsequent-stage current mirror circuit 42 amplifies the differential between the reference current $I_{ref}$ and detection current $I_{dat}$ and then outputs the signal OUT. The reference current $I_{ref}$ is preset to lie substantially between the maximum value and minimum value of the detection current $I_{dat}$. By comparing the signal level of the signal OUT with a predetermined threshold value that is established beforehand, fingerprint information consisting of binary data can be obtained.

Further, in this same figure, the CLK signal is the same as the pulse signal that is input to the shift register 11 and is synchronized with the switching timing of the analog switch 12.

Figure 5:
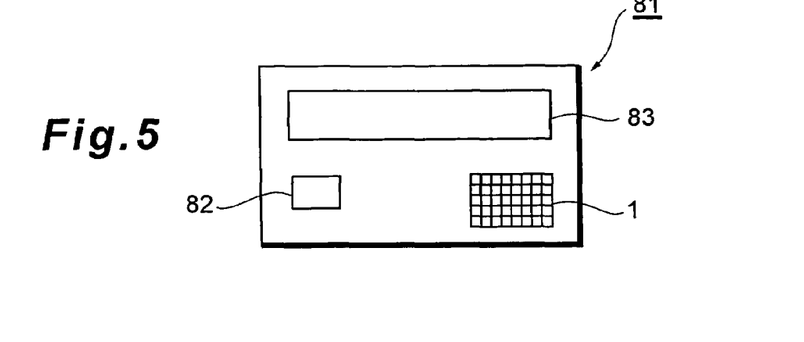
FIG. 5 is an application example for implementing the capacitance-type fingerprint sensor of the first embodiment.
Figure 6:
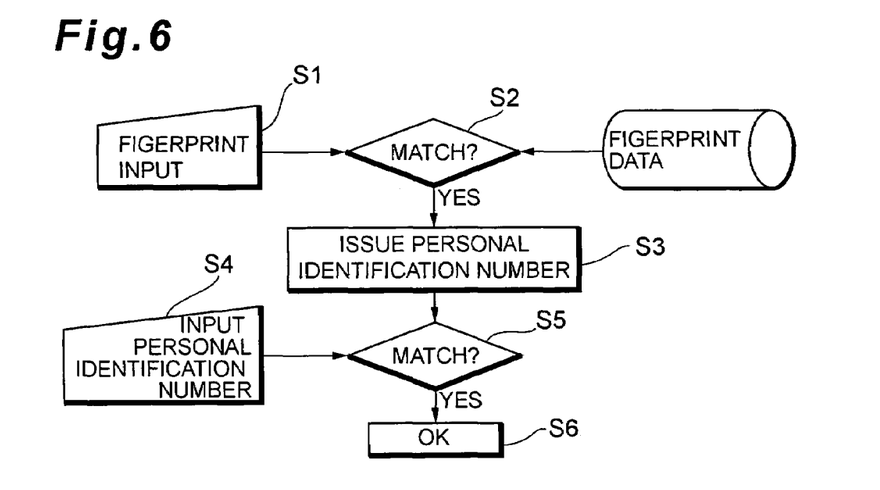
FIG. 6 is a flowchart showing the authentication procedure of the first embodiment.

Next, a description will be provided for an application example of the capacitance-type fingerprint sensor 1. FIG. 5 is a block diagram of a smart card 81 that is constituted comprising the capacitance-type fingerprint sensor 1 above, an IC chip 82, whereon a CPU, memory element, and so forth, are mounted, and a display device 83 such as a liquid crystal display is provided. Fingerprint information for the card owner is registered as biometrics information in the IC chip 82. FIG. 6 shows the authentication procedure of the smart card 81. As a result of the card user touching the fingerprint sensor 1 with his or her fingertip, fingerprint information is input to the smart card 81 (step S1), and this fingerprint information is collated with pre-registered fingerprint information (step S2). Here, when there is a match between the new fingerprint information and pre-registered fingerprint information (step S2;YES), a personal identification number is issued (step S3). Next, the personal identification number is input by the card owner (step S4). A check then follows of whether the personal identification number issued in step S3 and the personal identification number that is input in step S4 match one another (step S5). In the event of such a match (step S5; YES), card usage is permitted (step S6).

Therefore, by performing personal authentication by means of fingerprint information in addition to a personal identification number, a high-security smart card can be provided. A smart card that implements a biometrics authentication function can be used as a cash card, credit card, or as personal identification document, and so forth. The fingerprint sensor of this embodiment can be put to practical use in every kind of biometrics authentication device for performing personal authentication. For example, as a security system that performs room entry/departure management, the fingerprint sensor of this embodiment is installed in a door and fingerprint information for a person entering the room, which is input to the fingerprint sensor, and pre-registered fingerprint information are collated. While entry to the room is granted in the event of a match between this fingerprint information, entry to the room is denied when this fingerprint information does not match. Where required, this fingerprint sensor can also be used in a system that issues reports to a security firm or the like. Further, even in the case of electronic commerce via an open network such as the Internet, the fingerprint sensor of this embodiment can be effectively used as a biometrics authentication device for personal identification. In addition, this fingerprint sensor can be widely used in computer-terminal user authentication devices, and photocopier-user management devices, and so forth.

As described hereinabove, according to this embodiment, the current drive performance that regulates the sensing sensitivity is determined by the size of the transistor forming the amplification circuit 40 that functions as the current source. Therefore, unlike the transistors disposed in the active matrix portion 30, there are no restrictions on the installation space of the transistor, meaning that adequate current drive performance can be secured. Accordingly, even when the fingerprint sensor is a high-resolution sensor in which the integration density of the capacitance detection circuits 31 arranged in the active matrix portion 30 is relatively large, high-precision sensing is possible.

Furthermore, high-precision sensing of fingerprint information can be achieved by forming the amplification circuit 40 by means of the two-stage current mirror circuits 41 and 42. In addition, by forming the capacitance detection circuit 31 on a moderately strong low-cost substrate such as a glass substrate or plastic substrate, or the like, it is possible to implement an increase in the strength of the capacitance-type fingerprint sensor 1 and lower costs.

Further, although a fingerprint sensor was illustrated in the description above, as an embodiment of the capacitance detection circuit of the present invention, the present invention is not limited to or by this fingerprint sensor. The present invention can be put to practical use as a device for reading a minute asperity pattern of any subject as a capacitance variation. For example, the present invention could also be used to identify an animal's nose.

SECOND EMBODIMENT OF THE INVENTION

Figure 7:
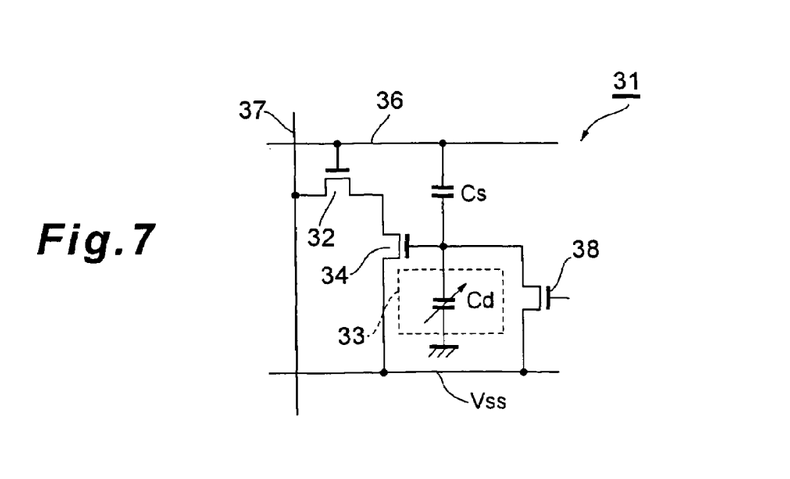
FIG. 7 shows the circuit constitution of the capacitance detection circuit of a second embodiment.

FIG. 7 shows the circuit constitution of the capacitance detection circuit 31 according to the second embodiment of the present invention. This detection circuit 31 is constituted comprising a reset transistor 38 in addition to the above-mentioned select transistor 32, capacitance 33, signal output element 34, scan line 36, data line 37, reference capacitance Cs, and low potential source line $V_{SS}$. As in the first embodiment above, the capacitance detection circuits 31 shown in this figure are arranged as an array in the active matrix portion 30 and the detected capacitance Cd of the capacitance 33 is read under the control of the data line driver 10 and scan line driver 20. The reset transistor 38 is controlled to open and close so as to enter an open state at the stage where the preliminary-stage capacitance detection circuit 31 is selected (pre-sensing period).

Because the reset transistor 38 is in an open state, the gate terminal of the signal output element 34 conducts with the low potential source line $V_{SS}$ such that the electrical charge injected into the gate terminal can be extracted. In the process of fabricating the capacitance-type fingerprint sensor, there is the possibility that electrical charge and so forth will be inadvertently injected into the gate terminal of the signal output element 34, and that the detection of fingerprint information will therefore be adversely affected. However, as a result of the above constitution, more stable operation can be implemented because the gate potential of the signal output element 34 can be reset at the preliminary stage of the fingerprint-information detection. Therefore, 'potential control means' are implemented by the reset transistor 38 and low potential source line $V_{SS}$. These 'potential control means' are means for controlling the gate terminal of the signal output element 34 to a predetermined potential. Here, the gate terminal is connected to the low potential source line $V_{SS}$. An optional switching element other than a transistor can be employed as the 'potential control means'.

Further, at the stage where the signal output element 34 enters the open state and the detection signal is output on the data line 37 (during the sensing period), the reset transistor 38 is controlled to enter the closed state in order to reliably read the detected capacitance Cd.

THIRD EMBODIMENT OF THE INVENTION

Figure 9:
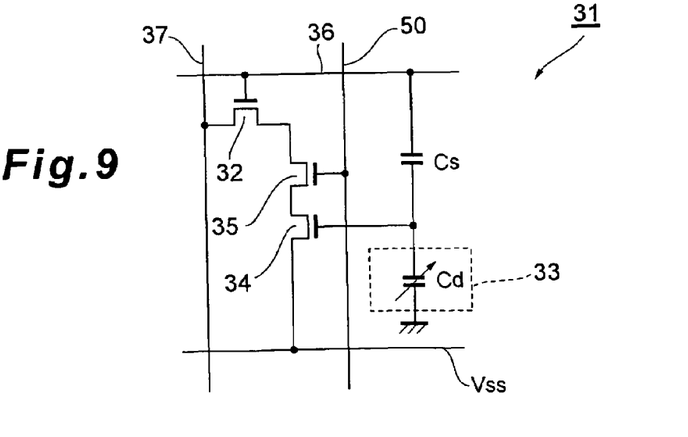
FIG. 9 shows the circuit constitution of the capacitance detection circuit of a third embodiment.

FIG. 9 shows the circuit constitution of the capacitance detection circuit 31 according to the third embodiment of the present invention. This detection circuit 31 is constituted comprising a data line select transistor 35 and data select line 50 in addition to the above-mentioned select transistor 32, capacitance 33, signal output element 34, scan line 36, data line 37, reference capacitance Cs, and low potential source line $V_{SS}$. As in the first embodiment above, the capacitance detection circuits 31 shown in this figure are arranged in M rows and N columns in the active matrix portion 30 and the detected capacitance Cd of the capacitance 33 is read under the control of the data line driver 10 and scan line driver 20.

When a certain specified data line 37 is considered, because detection signals from M capacitance detection circuits 31 that stand in a line in the column direction are outputted in sequence to this data line 37, when a detection signal is output by the capacitance detection circuit 31 disposed in the $(m+1)^{th}$ row and $n^{th}$ column after a detection signal has been output by the capacitance detection circuit 31 disposed in the $m^{th}$ row and $n^{th}$ column, the potential of the data line 37 varies. Hence, the problem arises that stable sensing cannot be performed. That is, because a detection signal of a different current level that corresponds to the detected capacitance Cd is output with different timing on the same data line 37, the detection signal that is output from the subsequent-stage capacitance detection circuit 31 is then subjected to the effects of the detection signal that was output by the preliminary-stage capacitance detection circuit 31.

Accordingly, in this embodiment, the potential of the data line 37 is stabilized by pre-charging the data line 37 to a predetermined potential $V_{dd}$ as a stage prior to outputting the detection signal on the data line 37. The data line select transistor 35 is a transistor that controls the passage and shutoff of electricity between the data line 37 and signal output element 34 and is controlled to enter the closed state at the stage where the data line 37 is pre-charged. The open/close control of the data line select transistor 35 is controlled by the data select line 50.

Figure 8:
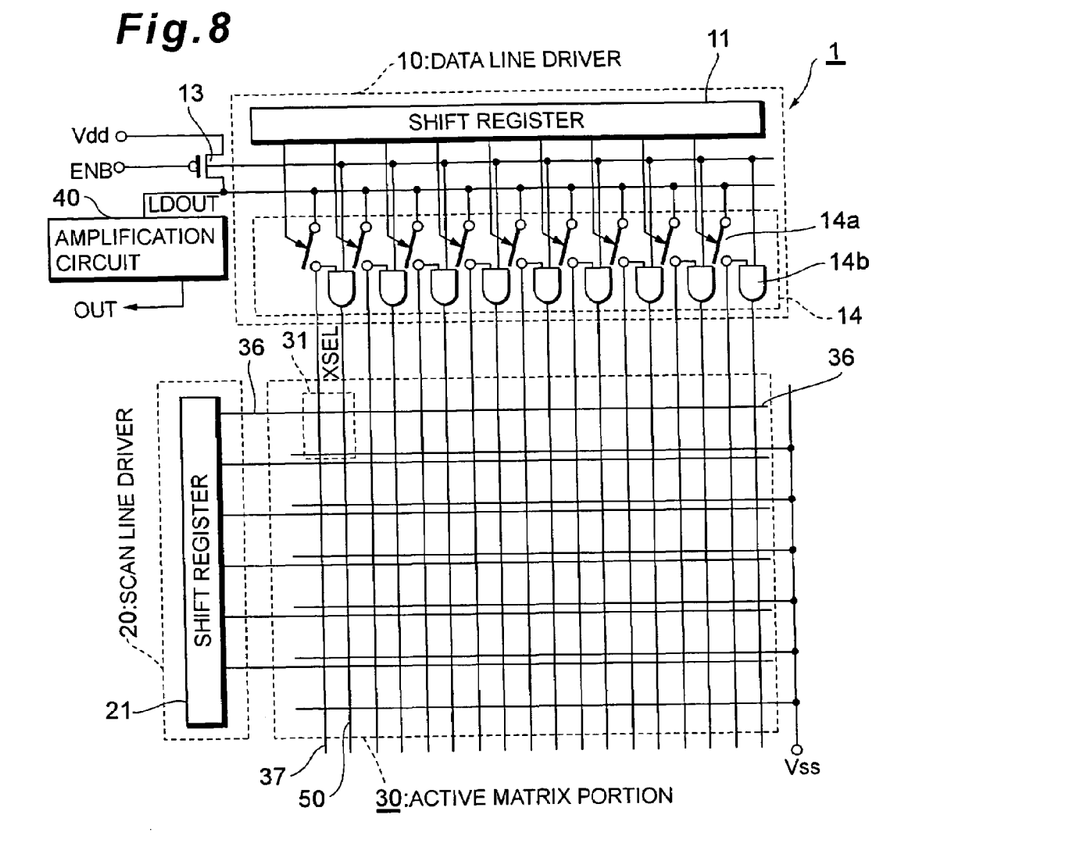
FIG. 8 is a block diagram of the capacitance-type fingerprint sensor of a third embodiment.

FIG. 8 is a block diagram of the capacitance-type fingerprint sensor 1 in which the capacitance detection circuits 31 are arranged in the form of an active matrix. As this figure shows, this fingerprint sensor 1 is constituted comprising the data line driver 10 for selecting the data lines 37, the scan line driver 20 for selecting the scan lines 36, the active matrix portion 30, which is the fingerprint detection region, and the amplification circuit 40 for amplifying the detection signal. The data line driver 10 is constituted comprising the shift register 11, which determines the timing for sequentially selecting the data lines 37, a pre-charge transistor 13 for supplying a pre-charge voltage to the data lines 37, and a pre-charge period selection circuit 14 for setting the pre-charge period.

Here, the 'pre-charging means' are implemented through the co-operation of the pre-charge transistor 13, the pre-charge period selection circuit 14, a driver (not shown), which outputs an ENB signal (enable signal) that regulates the pre-charge period, and a source $V_{dd}$, which supplies the pre-charge voltage to the data lines 37. In addition, the 'pre-charge period setting means' are implemented through the co-operation of the pre-charge period selection circuit 14 and the driver (not shown) that outputs the ENB signal that regulates the pre-charge period. The 'pre-charging means' and 'pre-charge period setting means' need not necessarily be implemented by a plurality of hardware components and may instead be implemented by a single hardware component.

The scan line driver 20 is constituted comprising the shift register 21, which determines the timing for sequentially selecting the scan lines 36. The capacitance detection circuits 31 are arranged in the form of a matrix (M rows×N columns) in the active matrix portion 30, in which M scan lines 36 and M low potential source lines $V_{SS}$ are wired in the row direction and N data lines 37 and N data select lines 50 are wired in the column direction.

Figure 10:
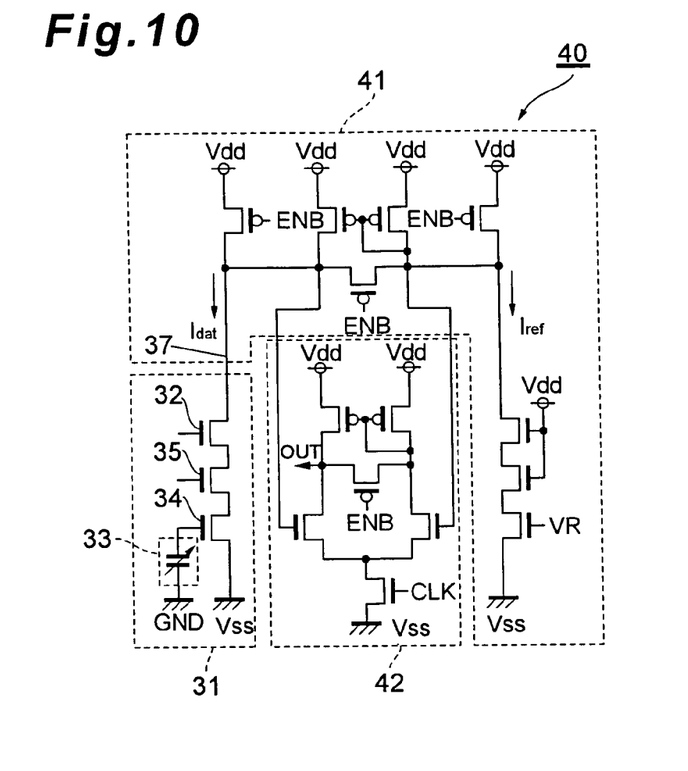
FIG. 10 shows the circuit constitution of the amplification circuit of the third embodiment.
Figure 11:
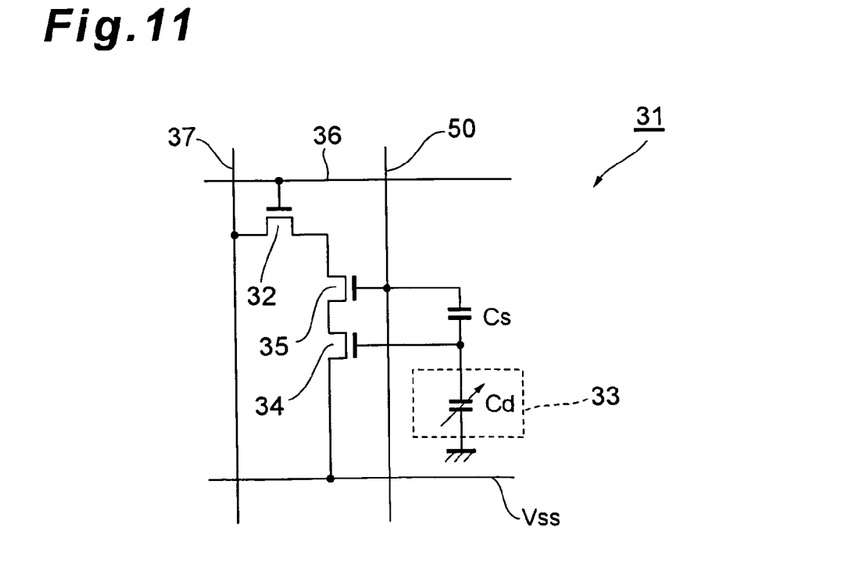
FIG. 11 shows the circuit constitution of the capacitance detection circuit of a third embodiment.

FIG. 10 shows the circuit constitution of the amplification circuit 40, the basic constitution being the same as that of the first embodiment above except for the fact that the CLK signal in FIG. 3 has been substituted by an ENB signal and that the data line selection transistor 35 has been added. In addition, the circuit constitution of the capacitance detection circuit 31 of this embodiment is not limited to or by the circuit constitution shown in FIG. 9, and may instead be the circuit constitution shown in FIG. 11. Whereas the reference capacitance Cs is connected to the scan line 36 and to one end of the capacitance 33 in FIG. 9, in FIG. 11, the reference capacitance Cs is connected to the data select line 50 and to one end of the capacitance 33.

Figure 12:
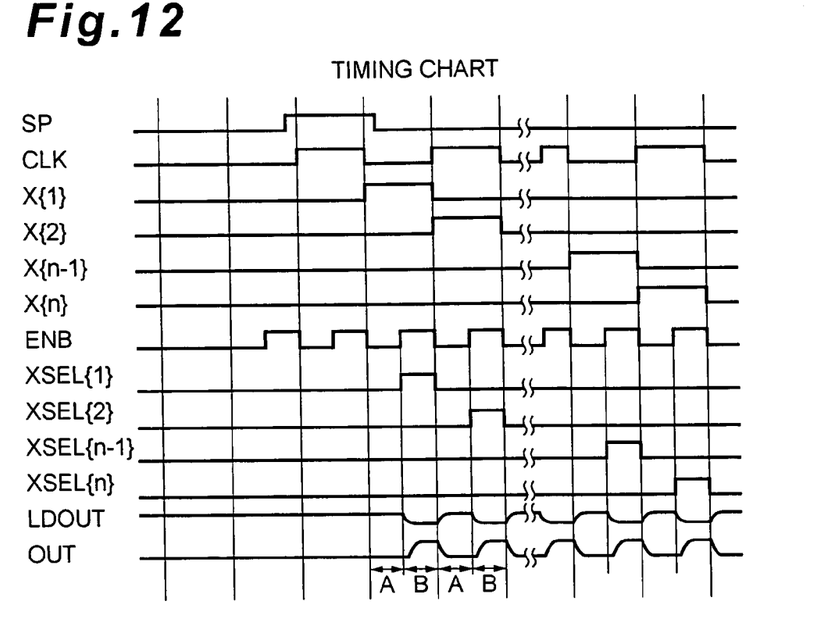
FIG. 12 is a timing chart for the third embodiment.

FIG. 12 is a timing chart for a variety of signals that are output by the data line driver 10. In this same figure, SP is a start pulse, CLK is a clock signal, X{1}, X{2}, ..., X{N} are output signals of the shift register 11, ENB is an enable signal for controlling the pre-charge transistor 13 to open and close, and XSEL{1}, XSEL{2}, ..., XSEL{N} are select signals that are outputted to the data select line 50. The first half of the period in which one capacitance detection circuit 31 is selected by the sequential selection of the shift register 11 in the data line driver 10 is established as the pre-charge period A and the latter half is established as the sensing period B.

In the pre-charge period A, the ENB signal is non-active (logical level L), and the pre-charge transistor 13 is in the open state. When an output signal X {k} with the logical level H is outputted by the shift register 11, the $k^{th}$ analog switch 14a conducts and hence the data line 37 of the $k^{th}$ column is pre-charged to the potential $V_{dd}$. Because the logical level of the enable signal is then L, the output of the AND circuit 14b is logical level L and hence an L level signal is output to the data select line 50. Accordingly, the data line select transistor 35 enters the closed state and the flow of a current from the source $V_{dd}$ to the capacitance detection circuit 31 is suppressed.

When the pre-charge operation is complete, a transition to the sensing period B follows, whereupon the enable signal becomes active (logical level H). The pre-charge transistor 13 then enters the closed state and, while the supply of power from the source $V_{dd}$ to the data line 37 (pre-charge) ceases, a H level output signal X{k} and a H level enable signal are inputted to the AND circuit 14b, and a H level signal is output to the data select line 50, which is the output line of the AND circuit 14b. Accordingly, an H level pulse is output to the data select line 50 of the $k^{th}$ column, and the data line select transistors 35 in the $k^{th}$ column enter the open state. As a result, the signal output element 34 is connected to the data lines 37 via the data line select transistors 35 and select transistors 32. In addition, because the ENB is active in the amplification circuit 40 shown in FIG. 10, the detection current, which flows to the capacitance detection circuit 31 via the data line 37, is amplified by the amplification circuit 40.

As described hereinabove, because, with the present invention, the operation to pre-charge the data lines 37 is performed at a stage prior to sensing, the potential of the data lines 37 during sensing is stabilized, whereby the operating margin can be enlarged. In addition, because the potential of the data lines 37 is stabilized, more rapid detection of fingerprint information is possible.

Figure 13:
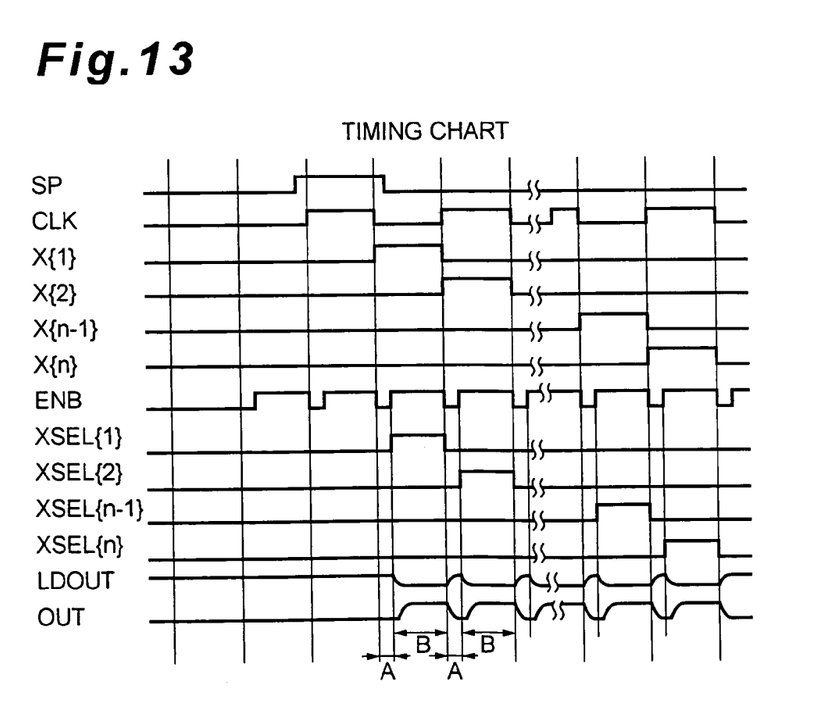
FIG. 13 is a timing chart for the third embodiment.

Although the pre-charge period A and sensing period B are subject to the relation 1:1 in the timing chart shown in FIG. 12, the present invention is not limited to such a relation. For example, the ratio (duty ratio) between the pre-charge period A and sensing period B may be regulated by changing the duty of the enable signal as shown in FIG. 13. Stabilizing the potential of the data lines 37 to a predetermined potential for a short time by shortening the pre-charge period A makes it possible to secure an adequate sensing period, whereby high-precision sensing is made possible. Moreover, the pre-charge source voltage is not restricted to $V_{dd}$, it being possible to employ an optional voltage.

I claim:

1. A capacitance detection device that reads asperity information for a subject surface by outputting a detection signal corresponding to the capacitance formed between the subject surface and the capacitance detection device, comprising:
   a detection unit in which is arranged a plurality of capacitance detection circuits that output the detection signal; and
   an amplification circuit that amplifies the detection signal, wherein the capacitance detection circuit comprises
   a reference capacitance having a fixed capacitance value,
   a sensor electrode for forming a capacitance between the subject surface and the sensor electrode,
   a signal output element that outputs a detection signal corresponding to a capacitance ratio of the reference capacitance to the capacitance formed between the subject surface and the sensor electrode,
   a low potential source line that connects to the signal transmission path of the detection signal; and
   a scan line for selecting the capacitance detection circuit, wherein the scan line charges the reference capacitance, wherein the amplification circuit functions as a signal source for outputting the detection signal to the capacitance detection circuit and is constituted such that the detection signal is transmitted from the amplification circuit to the low potential source line via the signal output element.

2. The capacitance detection device according to claim 1, wherein:
   the detection signal is a current signal; and
   the amplification circuit functions as a current source that supplies the current signal to the capacitance detection circuit.

3. The capacitance detection device according to claim 1, wherein the amplification circuit is formed outside the formation region of the detection unit.

4. The capacitance detection device according to claim 1, further comprising:
   a plurality of select lines for selecting the capacitance detection circuit; and
   a plurality of data lines for outputting the detection signal from the amplification circuit to the capacitance detection circuit,
   wherein the capacitance detection circuit further comprises a select transistor that connects to the respective scan line and is constituted such that the passage and shutoff of electricity between the respective data line and signal output element is controlled by means of open/close control of the select transistor.

5. The capacitance detection device according to claim 4, further comprising:
   pre-charging means that pre-charge the data line as a stage prior to outputting the detection signal on the data line.

6. The capacitance detection device according to claim 5, further comprising:
   pre-charge period setting means for setting the ratio between the pre-charge period, in which the pre-charging means execute data-line pre-charging, and the sensing period, in which the signal output element outputs the detection signal.

7. The capacitance detection device according to claim 1, wherein:
   the signal output element is constituted as a three-terminal transistor having a current control terminal, a current input terminal, and a current output terminal, and further comprises potential control means for controlling the potential of the current control terminal to a predetermined potential as a stage prior to outputting the detection signal corresponding to the capacitance.

8. The capacitance detection device according to claim 1, wherein the capacitance detection circuit is formed on an insulating substrate.

9. A fingerprint sensor that comprises the capacitance detection device according to claim 1 and is constituted to read fingerprint asperity information.

10. A biometrics authentication device that comprises the fingerprint sensor according to claim 9.

11. A drive method for a capacitance detection device that comprises a reference capacitance having a fixed capacitance value, a current amplification element that increases or reduces the gain of a current signal in response to a capacitance ratio of the reference capacitance to a capacitance formed between a subject surface and the capacitance detection device; a data line for supplying the current signal to the current amplification element; an amplification circuit that amplifies the current signal flowing through the data line; a select transistor that controls the passage and shutoff of electricity between the data line and the current amplification element; a scan line for selecting the select transistor; and a low potential source line that connects to the output path of the current signal, the drive method comprising the steps of:
   electrically shutting off the data line and the current amplification element from each other by closing the select transistor;
   pre-charging the data line to a predetermined potential;
   allowing electrical conduction between the data line and the current amplification element by opening the select transistor after the data-line pre-charging is complete;
   charging the reference capacitance via the scan line; and
   performing sensing by supplying a current signal from the amplification circuit to the current amplification element via the data line and amplifying the current signal by means of current gain that corresponds to the capacitance.

12. The drive method for the capacitance detection device according to claim 11, wherein the ratio between the period for executing the pre-charging step and the period for executing the sensing step is variable.

* * * * *